US010622607B2

United States Patent
Marpu

(10) Patent No.: US 10,622,607 B2
(45) Date of Patent: Apr. 14, 2020

(54) ELECTRIFIED VEHICLE BATTERY PACKS DESIGNED WITH SACRIFICIAL COMPONENTS

(71) Applicant: FORD GLOBAL TECHNOLOGIES, LLC, Dearborn, MI (US)

(72) Inventor: Amar Marpu, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 220 days.

(21) Appl. No.: 15/805,459

(22) Filed: Nov. 7, 2017

(65) Prior Publication Data
US 2019/0140234 A1    May 9, 2019

(51) Int. Cl.
| | |
|---|---|
| *H01M 2/12* | (2006.01) |
| *H01M 2/10* | (2006.01) |
| *H01M 10/6563* | (2014.01) |
| *H01M 10/625* | (2014.01) |
| *B60R 16/04* | (2006.01) |
| *B60K 1/04* | (2019.01) |
| *B60L 50/64* | (2019.01) |

(52) U.S. Cl.
CPC ......... *H01M 2/12* (2013.01); *H01M 2/1072* (2013.01); *H01M 2/1083* (2013.01); *H01M 10/625* (2015.04); *H01M 10/6563* (2015.04); *B60K 1/04* (2013.01); *B60L 50/64* (2019.02); *B60R 16/04* (2013.01); *H01M 2220/20* (2013.01)

(58) Field of Classification Search
CPC .... H01M 2/12; H01M 2/1072; H01M 2/1083; H01M 10/625; H01M 10/6563; H01M 2220/20; B62D 21/152; B60R 16/04; B60K 1/04; B60L 50/64

USPC ......................................... 296/187.09, 187.1
See application file for complete search history.

(56) References Cited

U.S. PATENT DOCUMENTS

| | | | | |
|---|---|---|---|---|
| 5,585,204 | A * | 12/1996 | Oshida ................ | H01M 10/443 429/120 |
| 8,367,233 | B2 | 2/2013 | Hermann et al. | |
| 9,061,714 | B1 | 6/2015 | Albery et al. | |
| 9,636,984 | B1 | 5/2017 | Baccouche et al. | |
| 2006/0249342 | A1* | 11/2006 | Canot ................... | B62D 21/152 188/377 |
| 2012/0129041 | A1* | 5/2012 | Komazawa ......... | H01M 2/1077 429/158 |
| 2013/0017421 | A1 | 1/2013 | Onnerud et al. | |
| 2015/0155534 | A1 | 6/2015 | Tsutsui et al. | |
| 2015/0197144 | A1* | 7/2015 | Jarocki ................... | B60K 1/04 180/232 |

FOREIGN PATENT DOCUMENTS

WO    2014/104462 A1    7/2014

\* cited by examiner

*Primary Examiner* — Gregg Cantelmo
(74) *Attorney, Agent, or Firm* — David B. Kelley; Carlson, Gaskey & Olds

(57) ABSTRACT

A battery pack includes an enclosure assembly, a sensitive battery component housed inside the enclosure assembly, and a sacrificial battery component packaged outside of the enclosure assembly. The sacrificial battery component includes a pre-defined failure area configured to minimize the transfer of impact loads into the enclosure assembly. The sacrificial battery component may plastically deform and break at the pre-defined failure area in response to an impact loading event that exceeds a pre-defined load threshold of the pre-defined failure area.

11 Claims, 5 Drawing Sheets

FIG. 4

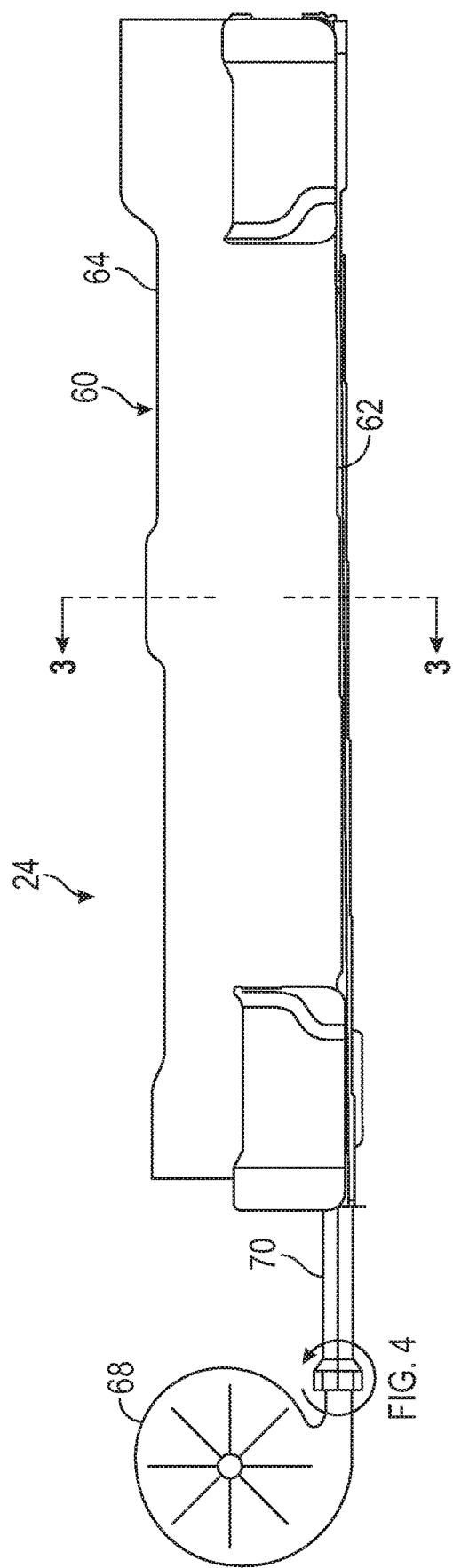
FIG. 2
FIG. 4
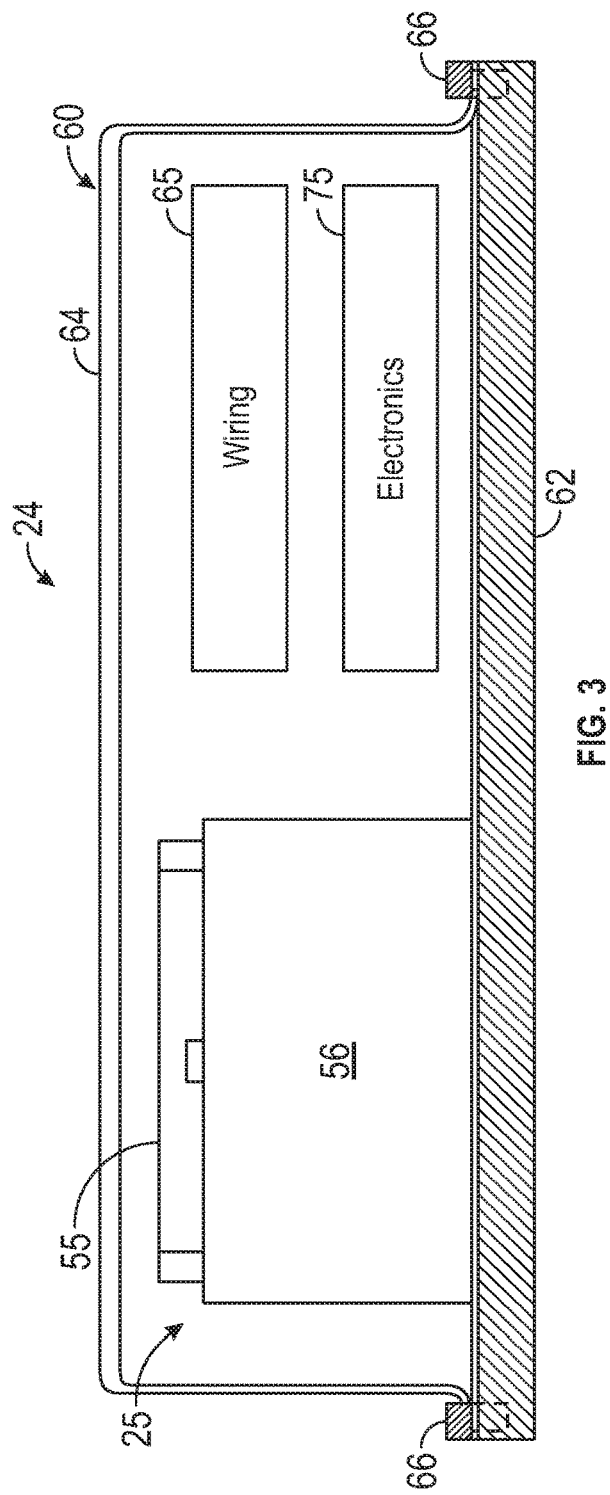
FIG. 3

ELECTRIFIED VEHICLE BATTERY PACKS DESIGNED WITH SACRIFICIAL COMPONENTS

TECHNICAL FIELD

This disclosure relates to battery packs for electrified vehicles. An exemplary battery pack includes a sacrificial component mounted outside an enclosure of the battery pack and equipped with a pre-defined failure area configured to minimize the transfer of impact loads into the enclosure. The proposed design allows for packaging more energy inside the enclosure.

BACKGROUND

The desire to reduce automotive fuel consumption and emissions is well documented. Therefore, vehicles are being developed that reduce or completely eliminate reliance on internal combustion engines. Electrified vehicles are currently being developed for this purpose. In general, electrified vehicles differ from conventional motor vehicles because they are selectively driven by one or more battery powered electric machines. Conventional motor vehicles, by contrast, rely exclusively on the internal combustion engine to propel the vehicle.

A high voltage battery pack typically powers the electric machines and other electrical loads of the electrified vehicle. The battery pack includes a plurality of energy storage devices, such as battery cells, that store energy for powering these electrical loads. The battery cells and various other battery components are typically packaged together inside an enclosure assembly. In recent years, the overall size of battery packs has increased in order to meet the range requirements of electrified vehicle customers. The increasing battery pack sizes (i.e., for providing more energy (e.g., cells) inside the pack) complicates the task of packaging all the battery components inside the enclosure assembly.

SUMMARY

A battery pack according to an exemplary aspect of the present disclosure includes, among other things, an enclosure assembly, a sensitive battery component housed inside the enclosure assembly, and a sacrificial battery component packaged outside of the enclosure assembly. The sacrificial battery component includes a pre-defined failure area configured to minimize the transfer of impact loads into the enclosure assembly.

In a further non-limiting embodiment of the foregoing battery pack, the enclosure assembly includes a tray and a cover secured to the tray.

In a further non-limiting embodiment of either of the foregoing battery packs, the sensitive battery component includes a battery assembly including a plurality of battery cells.

In a further non-limiting embodiment of any of the foregoing battery packs, the sacrificial battery component includes a fan.

In a further non-limiting embodiment of any of the foregoing battery packs, the sacrificial battery component includes a ducting.

In a further non-limiting embodiment of any of the foregoing battery packs, the pre-defined failure area includes a notch formed in an outer surface of the sacrificial battery component.

In a further non-limiting embodiment of any of the foregoing battery packs, the pre-defined failure area includes an area of reduced thickness in the sacrificial battery component.

In a further non-limiting embodiment of any of the foregoing battery packs, the pre-defined failure area includes a perforation formed in an outer surface of the sacrificial battery component.

In a further non-limiting embodiment of any of the foregoing battery packs, a second sacrificial battery component is packaged outside of the enclosure assembly.

In a further non-limiting embodiment of any of the foregoing battery packs, the sacrificial battery component is a ducting and the second sacrificial battery component is a fan.

In a further non-limiting embodiment of any of the foregoing battery packs, the fan is connected to the ducting, and the ducting is connected to the enclosure assembly.

A method according to another exemplary aspect of the present disclosure includes, among other things, packaging a sensitive battery component inside an enclosure assembly of a battery pack, packaging a sacrificial battery component outside of the enclosure assembly, and plastically deforming the sacrificial battery component at a pre-defined failure area in response to an impact loading event that exceeds a pre-defined load threshold of the pre-defined failure area.

In a further non-limiting embodiment of the foregoing method, the sacrificial component is at least one of a fan and a ducting.

In a further non-limiting embodiment of either of the foregoing methods, the pre-defined failure area includes a notch formed in an outer surface of the sacrificial battery component.

In a further non-limiting embodiment of any of the foregoing methods, the pre-defined failure area includes an area of reduced thickness of the sacrificial battery component.

In a further non-limiting embodiment of any of the foregoing methods, plastically deforming the sacrificial battery component includes shearing the sacrificial battery component at the pre-defined failure area.

In a further non-limiting embodiment of any of the foregoing methods, packaging the sacrificial battery component includes connecting a ducting to the enclosure assembly, and connecting a fan to the ducting.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

BRIEF DESCRIPTION OF THE DRAWINGS

FIG. 2 illustrates a battery pack of an electrified vehicle.

FIG. 3 is a cross-sectional view of the battery pack of FIG. 2.

DETAILED DESCRIPTION

This disclosure details various battery pack designs for use within electrified vehicles. An exemplary battery pack includes an enclosure assembly, a sensitive battery component housed inside the enclosure assembly, and a sacrificial battery component packaged outside of the enclosure assembly to save packaging space. The sacrificial battery component includes a pre-defined failure area. In response to an impact loading event, the sacrificial battery component may plastically deform, such as by breaking off at the pre-defined failure area, in order to limit the amount of impact loads that are transferred into the enclosure assembly, thereby protecting the sensitive battery components. These and other features are discussed in greater detail in the following paragraphs of this detailed description.

Figure 1:
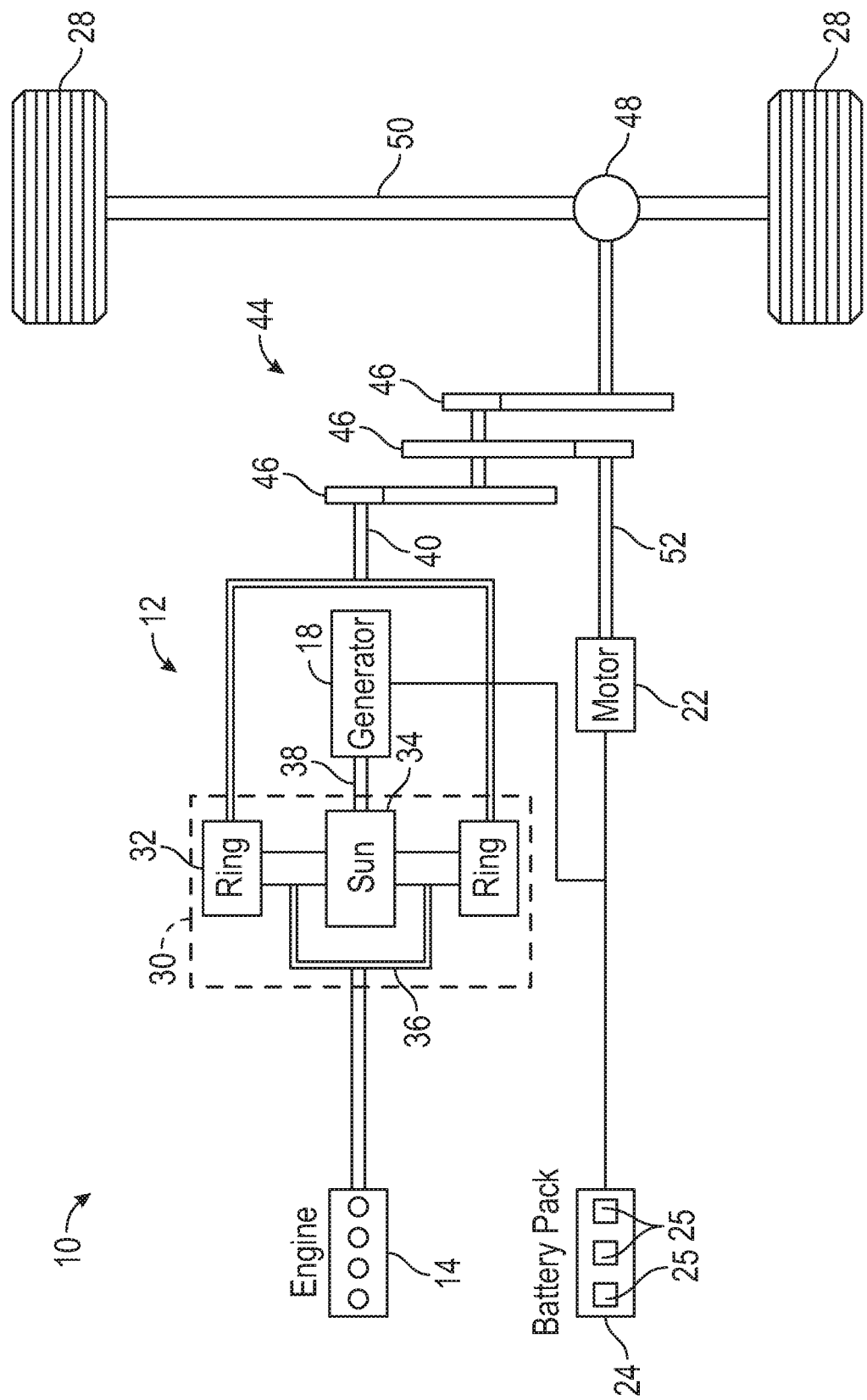
FIG. 1 schematically illustrates a powertrain of an electrified vehicle.

FIG. 1 schematically illustrates a powertrain 10 for an electrified vehicle 12. Although depicted as a hybrid electric vehicle (HEV), it should be understood that the concepts described herein are not limited to HEV's and could extend to other electrified vehicles, including, but not limited to, plug-in hybrid electric vehicles (PHEV's), battery electric vehicles (BEV's), fuel cell vehicles, etc.

In a non-limiting embodiment, the powertrain 10 is a power-split powertrain system that employs first and second drive systems. The first drive system includes a combination of an engine 14 and a generator 18 (i.e., a first electric machine). The second drive system includes at least a motor 22 (i.e., a second electric machine), the generator 18, and a battery pack 24. In this example, the second drive system is considered an electric drive system of the powertrain 10. The first and second drive systems are each capable of generating torque to drive one or more sets of vehicle drive wheels 28 of the electrified vehicle 12. Although a power-split configuration is depicted in FIG. 1, this disclosure extends to any hybrid or electric vehicle including full hybrids, parallel hybrids, series hybrids, mild hybrids or micro hybrids.

The engine 14, which may be an internal combustion engine, and the generator 18 may be connected through a power transfer unit 30, such as a planetary gear set. Of course, other types of power transfer units, including other gear sets and transmissions, may be used to connect the engine 14 to the generator 18. In a non-limiting embodiment, the power transfer unit 30 is a planetary gear set that includes a ring gear 32, a sun gear 34, and a carrier assembly 36.

The generator 18 can be driven by the engine 14 through the power transfer unit 30 to convert kinetic energy to electrical energy. The generator 18 can alternatively function as a motor to convert electrical energy into kinetic energy, thereby outputting torque to a shaft 38 connected to the power transfer unit 30. Because the generator 18 is operatively connected to the engine 14, the speed of the engine 14 can be controlled by the generator 18.

The ring gear 32 of the power transfer unit 30 may be connected to a shaft 40, which is connected to vehicle drive wheels 28 through a second power transfer unit 44. The second power transfer unit 44 may include a gear set having a plurality of gears 46. Other power transfer units may also be suitable. The gears 46 transfer torque from the engine 14 to a differential 48 to ultimately provide traction to the vehicle drive wheels 28. The differential 48 may include a plurality of gears that enable the transfer of torque to the vehicle drive wheels 28. In a non-limiting embodiment, the second power transfer unit 44 is mechanically coupled to an axle 50 through the differential 48 to distribute torque to the vehicle drive wheels 28.

The motor 22 can also be employed to drive the vehicle drive wheels 28 by outputting torque to a shaft 52 that is also connected to the second power transfer unit 44. In a non-limiting embodiment, the motor 22 and the generator 18 cooperate as part of a regenerative braking system in which both the motor 22 and the generator 18 can be employed as motors to output torque. For example, the motor 22 and the generator 18 can each output electrical power to the battery pack 24.

The battery pack 24 is an exemplary electrified vehicle battery. The battery pack 24 may be a high voltage traction battery pack that includes a plurality of battery assemblies 25 (i.e., battery arrays or groupings of battery cells) capable of outputting electrical power to operate the motor 22, the generator 18, and/or other electrical loads of the electrified vehicle 12. Other types of energy storage devices and/or output devices could also be used to electrically power the electrified vehicle 12.

In a non-limiting embodiment, the electrified vehicle 12 has two basic operating modes. The electrified vehicle 12 may operate in an Electric Vehicle (EV) mode where the motor 22 is used (generally without assistance from the engine 14) for vehicle propulsion, thereby depleting the battery pack 24 state of charge up to its maximum allowable discharging rate under certain driving patterns/cycles. The EV mode is an example of a charge depleting mode of operation for the electrified vehicle 12. During EV mode, the state of charge of the battery pack 24 may increase in some circumstances, for example due to a period of regenerative braking. The engine 14 is generally OFF under a default EV mode but could be operated as necessary based on a vehicle system state or as permitted by the operator.

The electrified vehicle 12 may additionally operate in a Hybrid (HEV) mode in which the engine 14 and the motor 22 are both used for vehicle propulsion. The HEV mode is an example of a charge sustaining mode of operation for the electrified vehicle 12. During the HEV mode, the electrified vehicle 12 may reduce the motor 22 propulsion usage in order to maintain the state of charge of the battery pack 24 at a constant or approximately constant level by increasing the engine 14 propulsion. The electrified vehicle 12 may be operated in other operating modes in addition to the EV and HEV modes within the scope of this disclosure.

FIGS. 2 and 3 illustrate a battery pack 24 that can be employed within an electrified vehicle. For example, the battery pack 24 could be part of the electrified vehicle 12 of FIG. 1. The battery pack 24 houses a plurality of battery cells 56 that store energy that can be used for powering various electrical loads of the electrified vehicle 12. The battery pack 24 could employ any number of battery cells within the scope of this disclosure, and this disclosure is not limited to the exact configuration shown in FIGS. 2 and 3.

The battery cells 56 may be stacked side-by-side along a longitudinal axis or on top of one another to construct groupings of battery cells 56, sometimes referred to as "arrays." In an embodiment, the battery cells 56 are lithium-ion prismatic cells. However, battery cells having other geometries (cylindrical, pouch, etc.), other chemistries (nickel-metal hydride, lead-acid, etc.), or both could alternatively be utilized within the scope of this disclosure. The battery pack 24 can include one or more separate groupings of battery cells 56.

The battery cells 56, along with any other support structures (e.g., spacers, rails, walls, plates, etc.), may be collectively referred to as a battery assembly 25. One battery assembly 25 is shown in FIG. 3; however, the battery pack 24 could include additional battery assemblies within the scope of this disclosure.

An enclosure assembly 60 generally surrounds each battery assembly 25 of the battery pack 24. In an embodiment, the enclosure assembly 60 is a sealed structure that includes a tray 62 and a cover 64 that is secured to the tray 62 to enclose and seal each battery assembly 25 of the battery pack 24. The cover 64 may be secured to the tray 62 in any known manner. In an embodiment, the cover 64 is mechanically fastened to the tray 62 using one or more fasteners 66 (see FIG. 3). The enclosure assembly 60 may include any size, shape, and configuration within the scope of this disclosure.

A multitude of sensitive battery components may be packaged inside the enclosure assembly 60 of the battery pack 24. In this disclosure, the term "sensitive battery component" denotes a component that is susceptible to electrical shorts and thermal events when exposed to shock, crash, vibration, and/or durability loads and therefore must be protected by housing the component inside the enclosure assembly 60. The sensitive battery components may include the battery assembly 25 (including the battery cells 56), bus-bar modules 55 (including bus bars), various wiring 65 (including sense leads, coolant lines, high voltage wiring, etc.) and various electronics 75 (including a Battery Energy Control Module (BECM), a Bussed Electric Center (BEC), etc.).

Further, a multitude of non-sensitive battery components of the battery pack 24 may be packaged outside of the enclosure assembly 60. In this disclosure, the term "non-sensitive battery component" denotes a component that is not susceptible to electrical shorts or thermal events and therefore need not be housed inside the enclosure assembly 60. In an embodiment, the battery pack 24 includes a fan 68 and ducting 70 that connects the fan 68 to the enclosure assembly 60. The fan 68 is adapted to generate airflow that is communicated through the ducting 70 and then inside the enclosure assembly 60, such as for thermally managing the battery cells 56 and/or other heat sensitive battery components. The fan 68 and the ducting 70 are considered non-sensitive battery components in this embodiment.

One or more of the non-sensitive battery components may act as a sacrificial battery component for limiting the transfer of impact loads into the enclosure assembly 60 where the sensitive battery components are located. In a first embodiment, the ducting 70 may be configured as a sacrificial component of the battery pack 24. In a second embodiment, the fan 68 may be configured as a sacrificial component of the battery pack 24. Exemplary sacrificial battery components are discussed in greater detail below.

Figure 4:
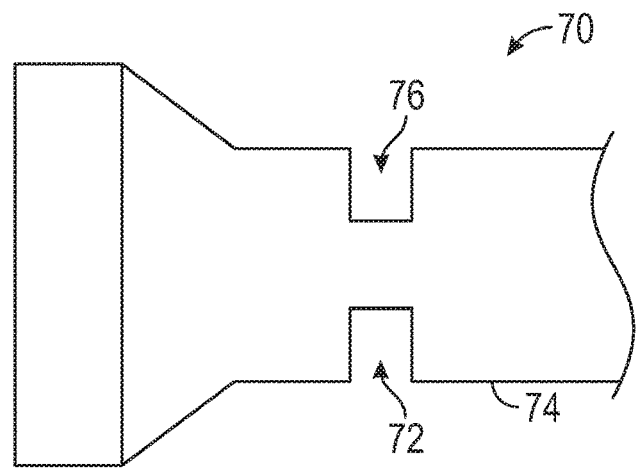
FIG. 4 is a blown up view of a section of a sacrificial component of the battery pack of FIG. 2. The sacrificial component includes a pre-defined failure area.

FIG. 4 illustrates the ducting 70 as a sacrificial battery component of the battery pack 24. The ducting 70 can be made sacrificial by incorporating a pre-defined failure area 72 into the ducting 70. The pre-defined failure area 72 may be formed in an outer surface 74 of the ducting 70 by scoring, cutting, or otherwise forming a shallow notch 76 into the outer surface 74. The notch 76 creates a weakened point in the ducting 70. The ducting 70 can plastically deform, such as by shearing, at the pre-defined failure area 72 if a force from an impact load exceeds a pre-defined load threshold of the ducting 70. The pre-defined load threshold could be a tension, compression, shear, or bending load threshold, for example. By breaking off at the pre-defined failure area 72 of the sacrificial battery component, which is outside of the enclosure assembly 60, energy is dissipated and intrusion into the enclosure assembly 60 where the sensitive battery components are located is minimized.

Figure 5:
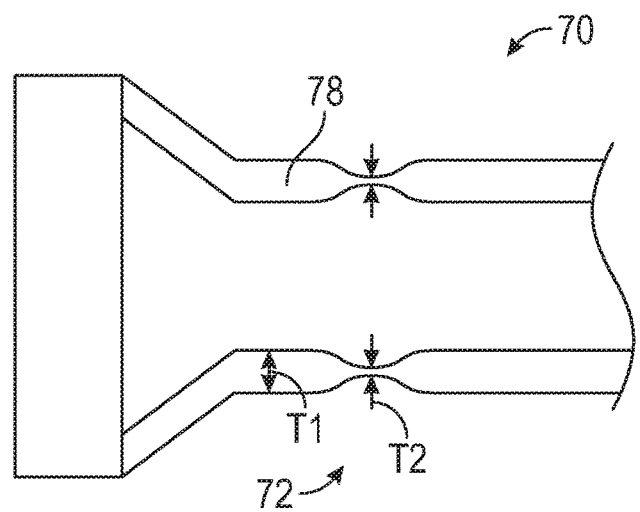
FIG. 5 illustrates another exemplary pre-defined failure area of a battery pack sacrificial component.

The pre-defined failure area 72 may be established by features other than or in addition to the notch 76 of FIG. 4. For example, as shown in FIG. 5, an outer diameter wall 78 of the ducting 70 may include an area having a thickness T1 and another area having a reducing thickness T2. The area of the reduced thickness T1 establishes the pre-defined failure area 72 of the ducting 70.

Figure 6:
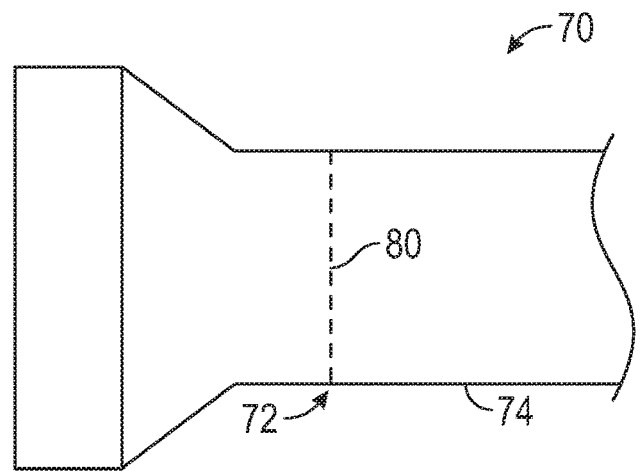
FIG. 6 illustrates yet another exemplary pre-defined failure area of a battery pack sacrificial component.

In yet another embodiment, shown in FIG. 6, the pre-defined failure area 72 may be formed by creating a perforation 80 in the outer surface 74 of the ducting 70. The perforation 80 creates a weakened point in the ducting 70. The ducting 70 can plastically deform, or break-off or rupture, at the pre-defined failure area 72 if an impact load exceeds the pre-defined load threshold of the ducting 70.

Figure 7:
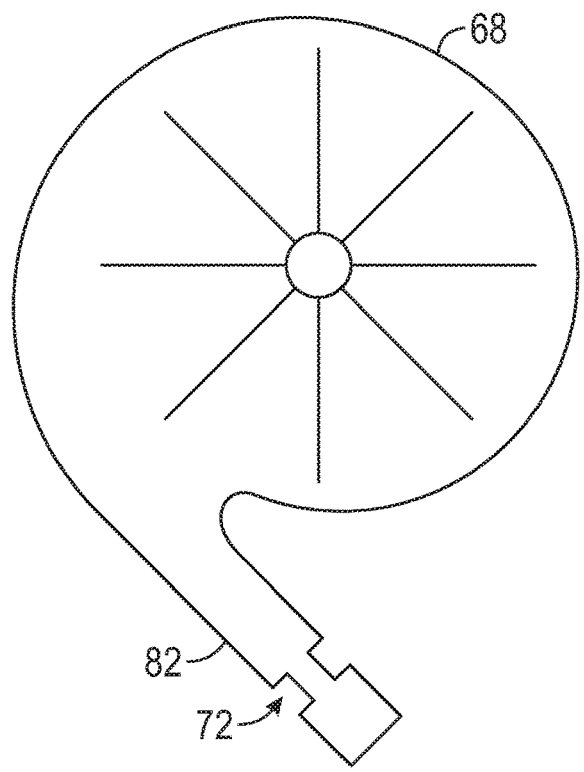
FIG. 7 illustrates another exemplary sacrificial component of a battery pack.

FIG. 7 illustrates the fan 68 as a sacrificial battery component of the battery pack 24. The fan 68 can be made sacrificial by incorporating a pre-defined failure area 72 into the fan 68. The pre-defined failure area 72 may be formed in a stem 82 of the fan 68 by using notches, reduced wall thicknesses, perforations, etc. The pre-defined failure area 72 creates a weakened point in the stem 82. The stem 82 can plastically deform at the pre-defined failure area 72 if an impact load exceeds the pre-defined load threshold of the stem 82.

Figure 8:
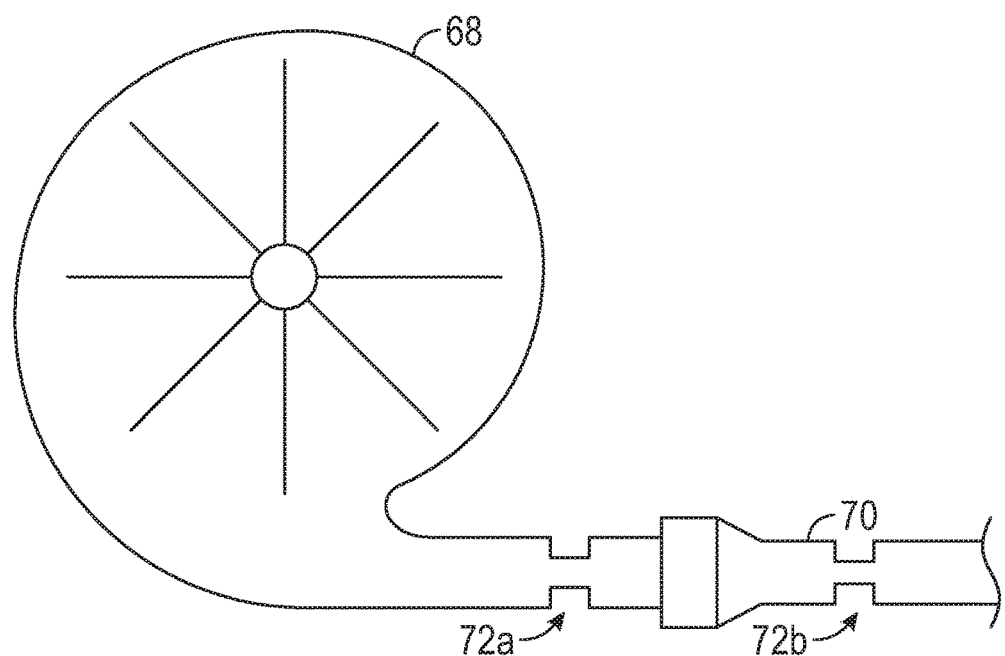
FIG. 8 illustrates additional sacrificial components of a battery pack.

In another embodiment, shown in FIG. 8, both the ducting 70 and the fan 68 may be designed as sacrificial components of the battery pack 24. This may be accomplished, for example, by designing a first pre-defined failure area 72A into the fan 68 and a second pre-defined failure area 72B into the ducting 70.

Figure 9:
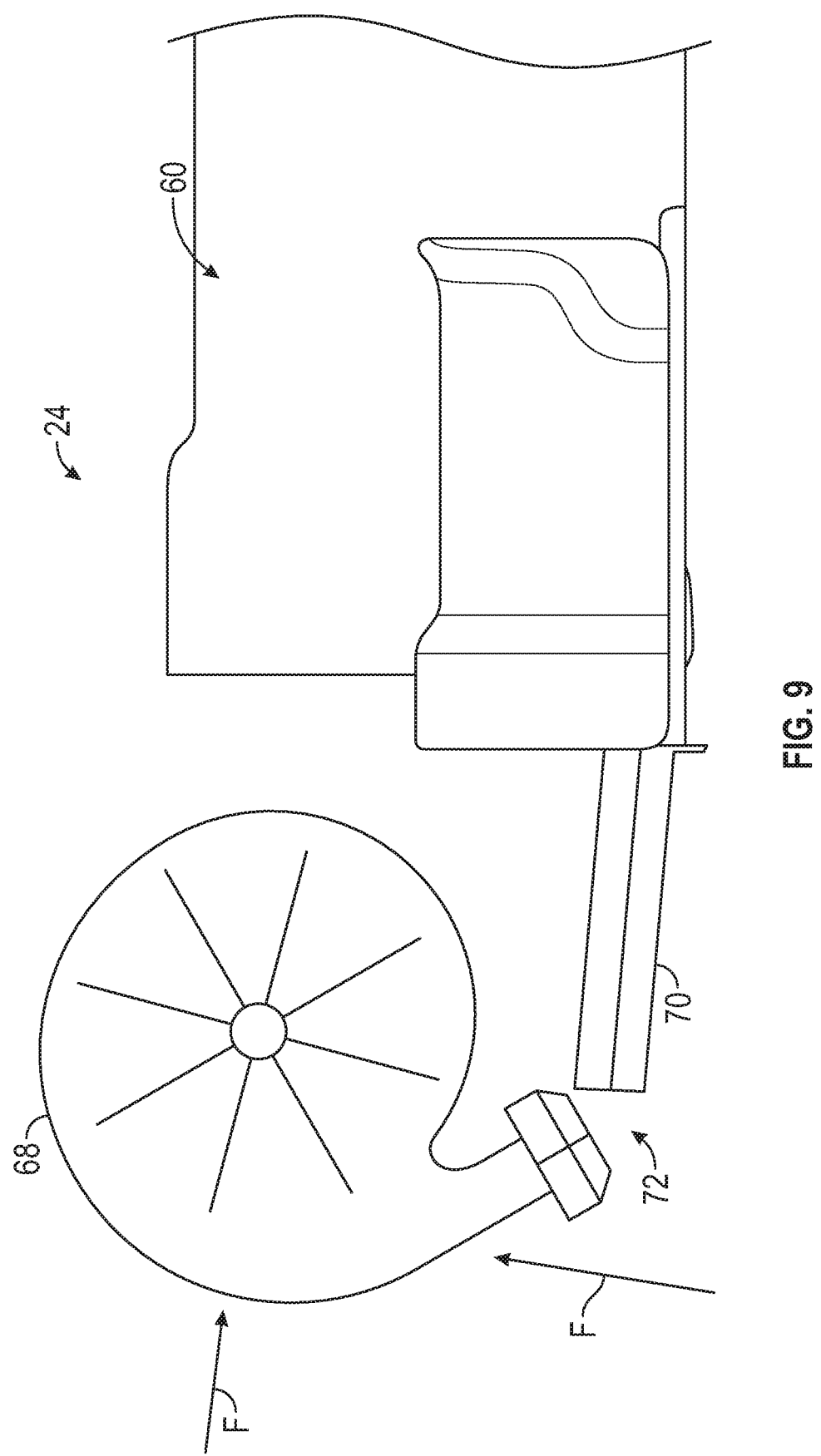
FIG. 9 schematically illustrates the behavior of a battery pack sacrificial component during an impact event in order to minimize the transfer of impact loads into an enclosure assembly of the battery pack.

FIG. 9 schematically illustrates the behavior of a sacrificial component of the battery pack 24 during an impact loading event. During a vehicle impact event (e.g., front, side, rear, side pole, etc.), a force F may be applied against the sacrificial component, which in this case is the ducting 70. In the illustrated embodiment, the force F is applied in the vertical axis. However, the force F could occur in other axes. The ducting 70 plastically deforms at the pre-defined failure area 72, such as by shearing. The plastic deformation absorbs the impact energy created by the force F, thereby minimizing the amount of energy that is transferred into the enclosure assembly 60. The sensitive battery components housed therein are therefore protected during the impact loading event.

The battery pack designs of this disclosure incorporate sacrificial components at a location external to the pack enclosure. Non-sensitive battery components can be made sacrificial by designing pre-defined failure areas into the components. The sacrificial components absorb energy and therefore minimize loading stack-up effects. In addition, the proposed designs move non-sensitive components outside of the enclosure assembly, thereby increasing the amount of available packaging space inside the enclosure assembly for packaging more energy (e.g., cells) inside the enclosure assembly.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A battery pack, comprising:
    an enclosure assembly including a tray and a cover secured to the tray;
    a sensitive battery component housed inside the enclosure assembly; and
    a sacrificial battery component packaged outside of the enclosure assembly and including a pre-defined failure area formed in an outer surface of the sacrificial battery component and configured to plastically deform to minimize the transfer of impact loads into the enclosure assembly,
    wherein the sacrificial battery component includes a fan,
    wherein the predefined failure area is formed in a stem of the fan.

2. The battery pack as recited in claim 1, wherein the sensitive battery component includes a battery assembly including a plurality of battery cells.

3. The battery pack as recited in claim 1, wherein the sacrificial battery component includes a ducting.

4. The battery pack as recited in claim 1, wherein the pre-defined failure area includes a notch formed in the outer surface of the sacrificial battery component.

5. The battery pack as recited in claim 1, wherein the pre-defined failure area includes an area of reduced thickness in the outer surface of the sacrificial battery component.

6. The battery pack as recited in claim 1, wherein the pre-defined failure area includes a perforation formed in the outer surface of the sacrificial battery component.

7. The battery pack as recited in claim 1, comprising a second sacrificial battery component packaged outside of the enclosure assembly.

8. The battery pack as recited in claim 7, wherein the sacrificial battery component is the fan and the second sacrificial battery component is a ducting.

9. The battery pack as recited in claim 8, wherein the fan is connected to the ducting, and the ducting is connected to the enclosure assembly.

10. The battery pack as recited in claim 1, wherein the sensitive battery component is a bus bar module, a battery electronic control module, or a bussed electric center.

11. A battery pack, comprising:
    an enclosure assembly;
    a sensitive battery component housed inside the enclosure assembly,
    wherein the sensitive battery component is a battery array that includes a plurality of battery cells; and
    a first sacrificial battery component and a second sacrificial battery component packaged outside of the enclosure assembly,
    wherein the first sacrificial battery component is a fan that includes a first pre-defined failure area formed in an outer surface of a stem of the fan and being configured to plastically deform to minimize the transfer of impact loads into the enclosure assembly,
    wherein the second sacrificial battery component is a ducting that connects axially between the stem of the fan and the enclosure assembly and includes a second pre-defined failure area formed in an outer diameter wall of the ducting and being configured to plastically deform to minimize the transfer of the impact loads into the enclosure assembly.

* * * * *